May 24, 1960  J. J. ROSE  2,938,147
CONTINUOUS IGNITION SYSTEM FOR A TURBOJET ENGINE
Filed Feb. 17, 1959
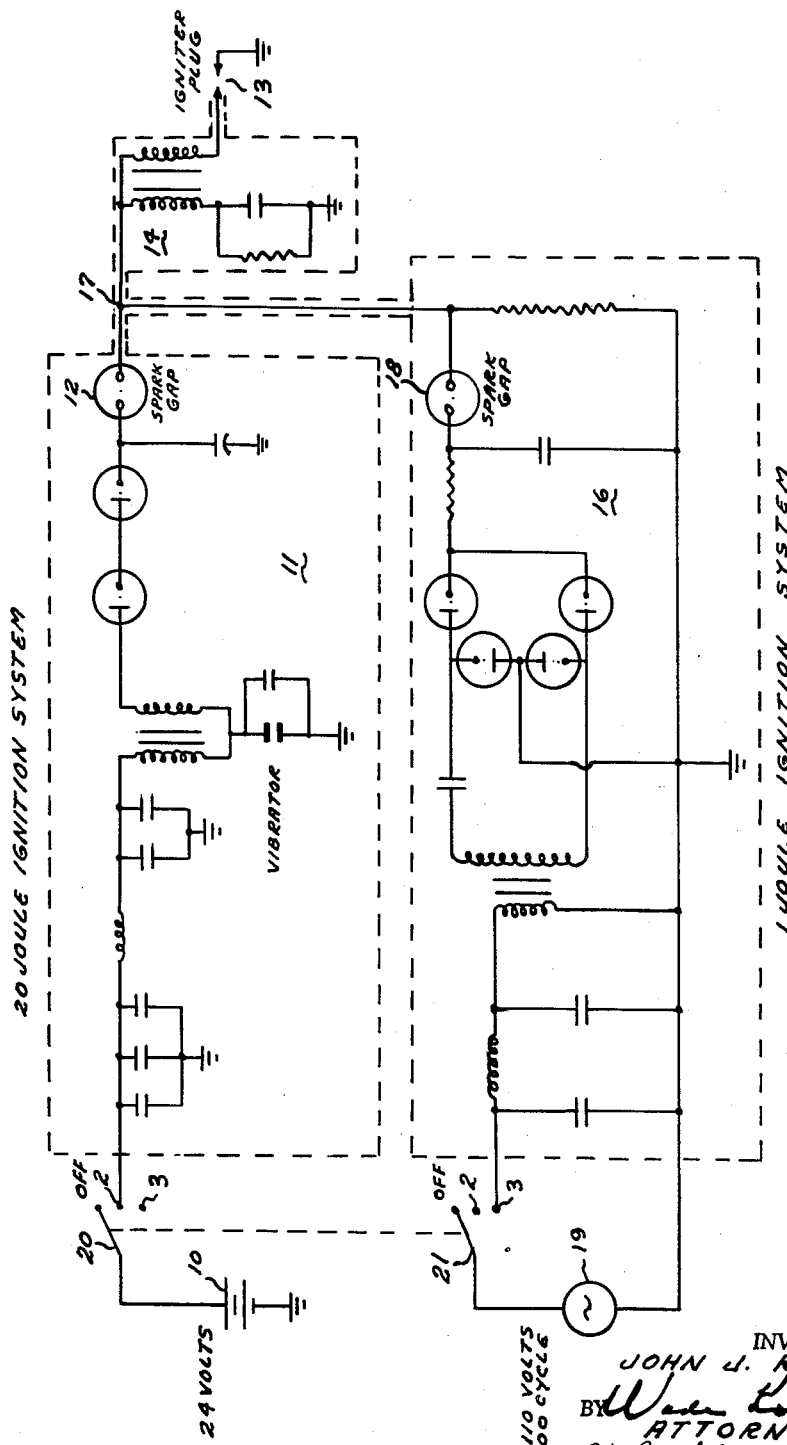
INVENTOR.
JOHN J. ROSE

2,938,147
CONTINUOUS IGNITION SYSTEM FOR A TURBOJET ENGINE

John J. Rose, 318 Dellwood Ave., Dayton, Ohio

Filed Feb. 17, 1959, Ser. No. 793,937

3 Claims. (Cl. 315—160)

(Granted under Title 35, U.S. Code (1952), sec. 266)

The invention described herein may be manufactured and used by or for the United States Government for governmental purposes without payment to me of any royalty thereon.

This invention relates to a continuous ignition system for a turbojet engine.

Prior to this invention it has been thought necessary to allow a turbojet engine to cool after a flame out before reignition. It has been found, however, that the conditions causing the flame out are transient and that immediately following the cessation of these conditions the conditions within the combustion chamber are favorable for reignition and if an ignition spark is present the turbojet will restart so that the flame out condition is hardly noticeable.

The present high energy ignition unit used with the turbojet engines is for short time use only and cannot be used continuously without causing damage to the igniter plug and to the ignition unit itself. It was also found that a high energy system required for cold start is not required to start the turbojet engine after flame out and that a continuously operating low energy system could be used for this purpose. Thus, a low energy unit operated off of the 400 cycle A.C supply, which is available after the engine is started, was connected in parallel with the presently used ignition unit. This low energy unit can be used continuously without damage to the igniter plug and can be switched on for continuous operation during flight after the turbojet engine has started and the high energy ignition unit has been switched off.

One object of the invention is to provide an ignition system for turbojets which reduces the danger due to flame outs.

Another object is to provide an ignition system for a turbojet engine capable of continuous operation.

These and other objects will be more fully understood from the following detailed description taken with the drawing, wherein the single figure shows an ignition system according to this invention.

Referring to the drawing, reference numeral 10 refers to the 24 volt D.C. supply now used with the normal high energy ignition unit 11. The ignition unit 11 is shown as a 20 joule vibrator capacitor discharge type ignition unit wherein the break down spark gap 13 causes a high energy spark to be applied to the igniter plug 13 through a compositor unit 14. The compositor 14 has a transformer $T_1$ and a capacitor $C_1$. When spark gap 13 breaks down an initial high voltage is applied to the igniter plug through the transformer $T_1$. After the igniter plug breaks down, capacitor $C_1$ discharges through the igniter plug. The resistor $R_1$ is for the purpose of removing any residual charge left on capacitor $C_1$ when the spark in the igniter plug ceases. The system thus far described is a normal ignition system used for starting a turbojet engine.

A low energy capacitor discharge ignition unit 16 of approximately one joule is connected at a point 17 between the high energy ignition unit 11 and the compositor unit 14 so that the output of ignition unit 16 is also applied to the igniter plug 13, when spark gap 18 breaks down, in the same manner as for the high energy unit. The low energy unit is supplied from a 110 volt 400 cycle supply 19 which is normally available after the engine starts. The ignition units are selectively energized by means of single pole triple throw switches 20 and 21. These switches may be any type which will deenergize ignition unit 11 when ignition unit 16 is energized and should have an off position for both ignition units. The switch should preferably be capable of passing from the third position to the off position without passing through the second position. The energy values given for the high ignition unit and low ignition unit are merely illustrated and are not intended to be limiting.

Though the system is shown as used with a high energy ignition unit having a compositor unit, the low energy ignition unit can also be added to units which do not use compositor units. It is to be understood also that each of the ignition units could have a separate compositor with the output of the compositors being connected together before application to the igniter plug.

While the type of switch shown would commonly be used, it was found that the ignition units could be used simultaneously without interference between the units so that the A.C. unit could be energized along with the D.C. unit in position 2 of the switch, with position 3 merely serving to disconnect the D.C. unit.

It was thought that a semiconductive igniter plug would be needed due to the high pressure in the combustion chamber at the time of the flame out. However, it was found that standard plugs such as a Champion AA–15s could be used.

There is thus provided an ignition system for a turbojet engine which is capable of continuous operation and which reduces the danger due to flame outs.

While one specific embodiment has been described in some detail it is obvious that numerous changes could be made without departing from the general principles and scope of the invention.

I claim:

1. An ignition system for a turbojet engine, comprising; an igniter plug, a high energy spark gap type ignition unit, means for applying the output of said high energy unit to said igniter plug, a D.C. supply, switch means connected between said D.C. supply and said high energy ignition unit, a low energy spark gap ignition unit, means for applying the output of said low energy unit to said igniter plug, an A.C. supply, switch means connected between said A.C. supply and said low energy ignition unit, means for opening the switch between the D.C. supply and said high energy ignition unit when the switch between said A.C. supply and said low energy ignition unit is closed.

2. An ignition system for a turbojet engine, comprising; an igniter plug, a high energy ignition unit, means for applying the output of said high energy ignition unit to said igniter plug, a D.C. supply, switch means connected between said D.C. supply and said high energy ignition unit, a low energy ignition unit, said low energy ignition unit being capable of continuous operation, means for applying the output of said low energy unit to said igniter plug, an A.C. supply, switch means connected between said A.C. supply and said low energy ignition unit, and means for selectively closing the switches between the D.C. and A.C. supplies and the high energy ignition unit and the low energy ignition unit respectively.

3. An apparatus for use with a high energy ignition system having a high energy ignition unit, a compositor unit, an igniter plug, a D.C. supply, switch means connected between said D. C. supply and said high energy ignition unit and means for applying the output of said high energy ignition unit to said igniter plug through said compositor unit, comprising a low energy ignition unit, said low energy ignition unit being capable of continuous operation, means for connecting said low energy ignition unit to said high energy ignition system between said high energy ignition unit and said compositor unit, an A.C. supply, switch means connected between said A.C. supply and said low energy ignition unit, and means for selectively closing the switches between the D.C. and A.C. supplies and the high energy ignition unit and the low energy ignition unit respectively.

References Cited in the file of this patent

FOREIGN PATENTS 660,178     Great Britain _____ Sept. 31, 1951